United States Patent [19]

Saemann

[11] 4,443,035
[45] Apr. 17, 1984

[54] WINDOW ASSEMBLY

[75] Inventor: Karl L. Saemann, Speyer, Fed. Rep. of Germany

[73] Assignee: Deere & Company, Moline, Ill.

[21] Appl. No.: 323,327

[22] Filed: Nov. 20, 1981

[30] Foreign Application Priority Data

Feb. 26, 1981 [DE] Fed. Rep. of Germany ....... 3107208

[51] Int. Cl.³ .............................................. B62D 33/06
[52] U.S. Cl. ..................................... 296/190; 160/88; 160/183; 160/207; 180/89.12
[58] Field of Search .............................. 296/190, 146; 180/89.12; 160/88, 207, 183

[56] References Cited

U.S. PATENT DOCUMENTS

| | | | |
|---|---|---|---|
| 1,733,694 | 10/1929 | Price | 160/190 |
| 2,771,133 | 11/1956 | Haskell | 160/207 |
| 2,815,243 | 12/1957 | Campbell | 296/190 |
| 3,866,969 | 2/1975 | Sandrock et al. | 296/28 C |
| 4,075,788 | 2/1978 | Anderson | 49/324 |
| 4,116,483 | 9/1978 | Kramer et al. | 296/28 C |

FOREIGN PATENT DOCUMENTS 644238 10/1950 United Kingdom ................ 296/190

OTHER PUBLICATIONS

8100 Ford–Die Starken Ford Traktoren TW-10 and TW-20 Brochure.
Fiat 1300 DT Supe Brochure.
Fiat 780 DT Brochure, Sep. 1980.
Rantor . . . is more than a tractor! Brochure, Oct. 1980.

Primary Examiner—Bruce H. Stoner, Jr.
Assistant Examiner—John A. Carroll

[57] ABSTRACT

A window assembly for a vehicle cab having first and second frames and a window horizontally divided into upper and lower sections. The upper section of the window is pivotally mounted to the top rail of the second frame which is totally surrounded by the first frame. The lower window section is hinged to the bottom of the upper window section and has a guide member on its bottom edge which mates with side guide rails formed in the second frame. The window is opened and closed by hydraulic cylinders which positively position and retain the window in a desired position regardless of the vibration or rocking motion experienced by the vehicle as it traverses over uneven terrain. Furthermore, the entire second frame can be opened by pivoting it about the upper edge of the first frame. In so doing, an alternative escape route is provided for leaving the confines of the cab.

14 Claims, 11 Drawing Figures

WINDOW ASSEMBLY

BACKGROUND OF THE INVENTION

1. Field of the Invention

This invention relates to a window assembly for a vehicle and more particularly to a rear window assembly for the cab of an agricultural tractor.

2. Description of the Prior Art

Rear window assemblies which can be partly or completely opened have become common items on off-road type vehicles. This is especially true in many foreign countries where the legal requirements call for a second exit route from the cab in case of an emergency, such as when the door becomes jammed. A two section window that can be opened has a definite advantage over a fixed undivided window in that the two section window increases visibility and provides for an additional access to the cab when the window is open. However, the prior art constructions have been deficient in providing a sufficiently robust design which is reliably adjustable in spite of the vibrations of the vehicle. During times of nice weather, the vehicle operator is inclined to keep the window at least partially open for ventilation reasons, and it becomes an annoyance when the window assembly slams shut due to the motion of the vehicle as it traverses uneven terrain. In addition, it sometimes becomes necessary to open both sections of the window assembly and have the window assembly remain in this position for a required period of time. Many of the prior art designs permit a complete opening of the window but do not provide a mechanism for retaining the window in such a position.

Now a window assembly has been invented which will overcome the above-mentioned problems.

SUMMARY OF THE INVENTION

Briefly, this invention relates to a window assembly for a vehicle cab. The window assembly has a first frame member which structurally forms part of the cab and encompasses a second frame member. Pivotally attached to the top rail of the second frame member is a window which is horizontally divided into upper and lower sections which are hinged together. The lower window section has a guide member on its bottom edge which mates with side guide rails formed in the second frame member so as to control the position of the window with respect to the second frame member. Hydraulic cylinders are connected to the upper window section which positively position and retain the window in a desired position regardless of the vibration or rocking motion experienced by the vehicle as it traverses over uneven terrain. Furthermore, the entire second frame member can be opened by pivoting it about the upper edge of the first frame member. In so doing, an alternative escape route is provided for leaving the confines of the cab.

The general object of this invention is to provide a window assembly for a vehicle cab which can be opened. A more specific object of this invention is to provide a rear window assembly for the cab of an agricultural vehicle which will maintain a set open position even when the vehicle experiences a large amount of vibration.

Another object of this invention is to provide a window assembly for a vehicle which can be opened a sufficient amount to permit an operator to escape from the cab in case of an emergency.

Still another object of this invention is to provide a window assembly which can be locked in various positions.

Other objects and advantages of the present invention will become more apparent to those skilled in the art in view of the following description and the accompanying drawings.

DETAILED DESCRIPTION OF THE INVENTION

Figure 1:
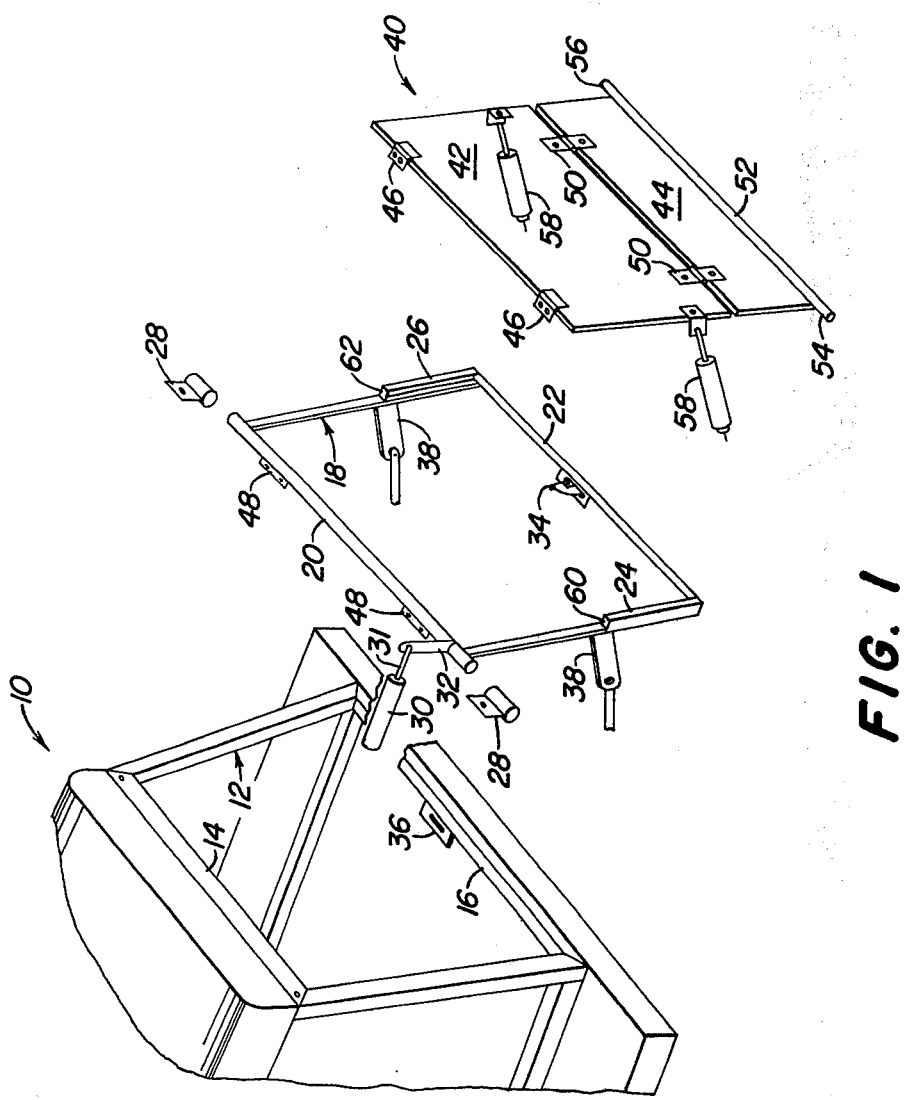
FIG. 1 is an exploded perspective view of a flat surfaced window embodiment.

Referring to FIG. 1, a vehicle cab 10 is shown which in part is structurally constructed with a first frame 12. The first frame 12 is to the rear of the cab, although it could be elsewhere, and has upper and lower surfaces 14 and 16, respectively. The first frame 12 is configured to surround a second frame member 18 which has a top rail 20, a bottom rail 22 and a pair of oppositely aligned side guide rails 24 and 26. The top rail 20 is pivotally attached to the upper surface 14 of the first frame 12, such as by connecting brackets 28. The second frame 18 can manually, mechanically, electrically or hydraulically pivot in relation to the first frame 12. One such control mechanism is shown consisting of a hydraulic cylinder 30 having a cylinder rod 31 connected to a lever 32 which in turn is permanently fixed to the top rail 20. By retracting the cylinder rod 31 the second frame 18 is swung outwardly and by extending the cylinder rod 31 the second frame 18 is brought back into contact with the first frame 12.

Located on the bottom rail 22 of the second frame 18 is a latch 34 which cooperates with a catch 36 mounted on the lower surface 16 of the first frame 12. The latch 34 and catch 36 enables the second frame 18 to be locked or secured to the first frame 12. The second frame 18 also includes retaining means 38, for example a pair of arms, for retaining the second frame 18 in an open position relative to the first frame 12. The retaining means 38 are particularly useful in holding the second frame 18 open 90 degrees or more with respect to the first frame 12 so that the operator of the vehicle can escape from the confines of the cab 10 in case of an emergency, i.e., such as when the vehicle has rolled over on its side and access through the door is impossible.

A window 40, divided approximate its midplane by a horizontally extending division into upper and lower window sections 42 and 44, respectively, is attached to the top rail 20 of the second frame 18 by hinges and brackets 46 and 48, respectively. The upper and lower window sections 42 and 44 are also joined together by flexible connecting means 50, such as conventional hinges, plastic straps, adhesive tape-like material or any other applicable hardware. The flexible connecting means 50 enables the lower section 44 to be angularly positioned with respect to the upper section 42 as well as being flush therewith when the window 40 is in the closed position within the second frame 18.

Secured to the bottom edge of the lower window section 44 is an elongated guide member 52 having oppositely aligned ends 54 and 56 extending longitudinally outward therefrom. The ends 54 and 56 mate in the guide rails 24 and 26 which are configured to snugly surround the ends 54 and 56. For example, U-shaped guide rails 24 and 26 partially surround the cylindrical ends 54 and 56 of the guide member 52 while permitting the ends 54 and 56 to be vertically slideable therein.

The window 40 is opened or closed by positioning means 58, such as a pair of power driven hydraulic cylinders, which are attached to the upper window section 42. The positioning means 58 permit the window 40 to be opened varying amounts, in a stepless manner, and to be held in the desired position irregardless of the amount of vibration or irradic movement imparted to the cab 10 of the vehicle. The positioning means 58 force the upper window section 42 outward and cause the lower window section 44 to pivot about the connecting means 50. Further outward movement of the upper window section 42 causes the ends 54 and 56 of the guide member 52 to vertically move upward in the grooves of the guide rails 24 and 26. As shown in FIG. 1, the guide rails 24 and 26 are approximately half the height of the sides of the second frame 18 and have a capped upper end 60 and 62, respectively, which prevent the ends 54 and 56 of the guide member 52 from becoming free of the second frame 18. However, it should be noted that the guide rails 24 and 26 can be increased in length if a greater width of opening were required.

Figure 2:
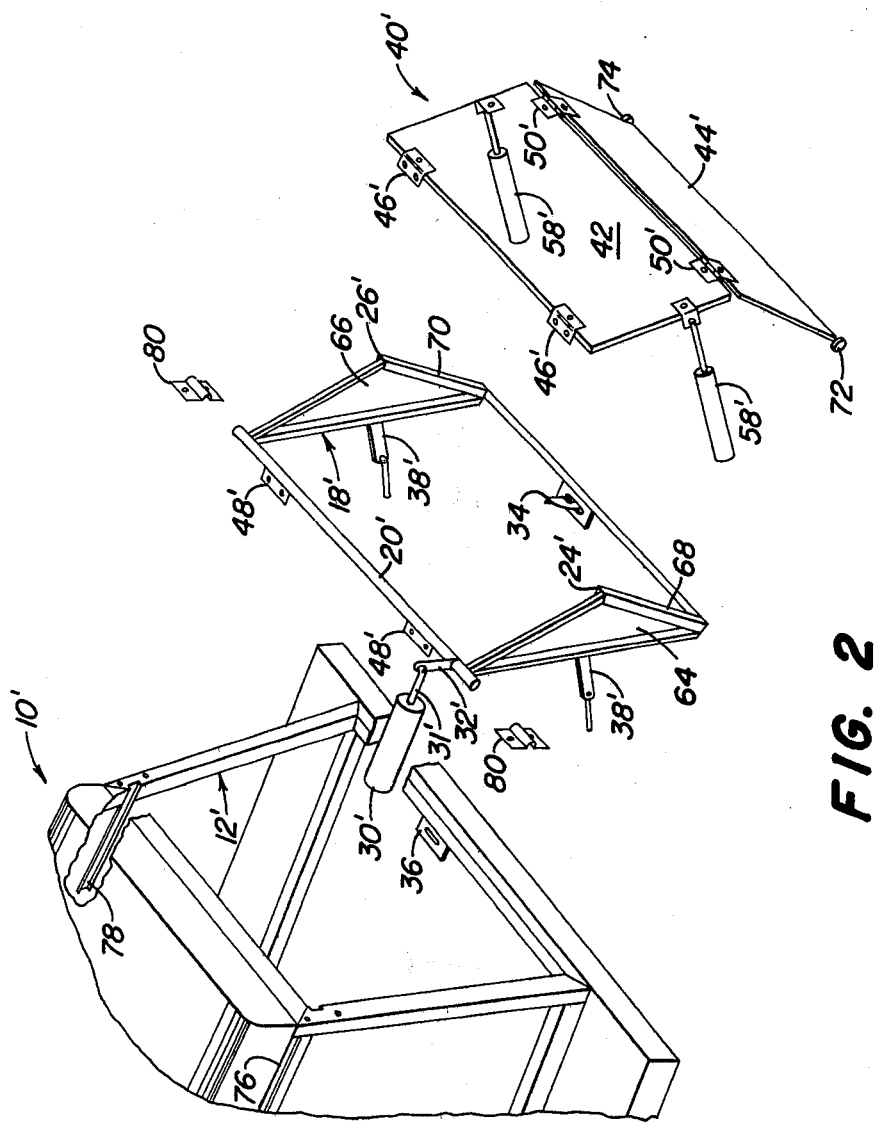
FIG. 2 is an exploded perspective view of an angle surfaced window embodiment.

Referring now to FIG. 2, an alternative embodiment is shown having an angular second frame 18'. For the purpose of simplification, prime members are used in FIG. 2 which correspond to similar parts listed in FIG. 1. The second frame 18' is constructed with two triangular side members 64 and 66 which extend outward therefrom. The two triangular side members 64 and 66 can be equilateral triangles wherein the apexes of the triangles coincide with the axis dividing the window 40' into upper and lower sections 42' and 44', respectively. Preferably, the triangular side members 64 and 66 angularly dispose the upper window section 42' at about 10 to 30 degrees outward from the second frame 18'. Mounted on the lower legs 68 and 70 of the triangular side members 64 and 66, respectively, are the guide rails 24' and 26'. These guide rails 24' and 26' cooperate with circular disk-shaped members 72 and 74 attached to the bottom edge of the lower window section 44'. The disk-shaped members 72 and 74 serve the same purpose as the guide ends 54 and 56, shown in FIG. 1. By angling the window 40' outward, additional space is provided in the cab 10'.

A third alternative embodiment is also depicted in FIG. 2 which includes slide rails 76 and 78 formed on the first frame 12' which provides a guide for the top rail 20' of the second frame 18. The slide rails 76 and 78 permit the upper window section 42' to be displaced inward into the cab 10' as the lower window section 44' is opened, i.e., moved upward unaccompanied by any pivotal outward movement. In addition, the guide rails 24' and 26' can be made telescopic in order to impart sufficient stability to the lower window section 44' even when the disk-shaped members 72 and 74 reach the apexes of the respective triangles. One further change to make the third alternative operable is that the connecting brackets 28 are replaced with C-shaped brackets 80 in order to permit the top rail 20' to slide inward on the slide rails 76 and 78 while preventing complete outward separation from the first frame 12'.

Figure 3:
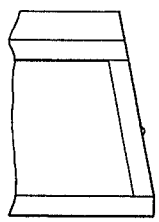
FIGS. 3-5 illustrate diagrammatically three different positions of the flat-surface window embodiment.
Figure 4:
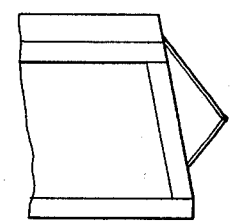
Figure 5:
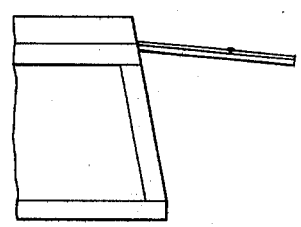
Figure 6:
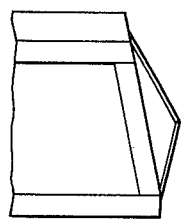
FIGS. 6-8 illustrate diagrammatically three different positions of the angle-surface window embodiment.
Figure 7:
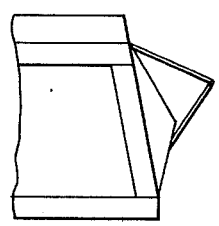
Figure 8:
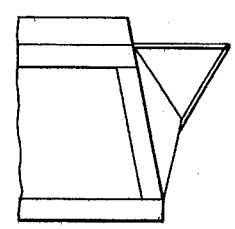
Figure 9:
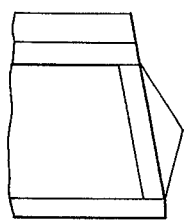
FIGS. 9-11 illustrate diagrammatically three different positions of a slideably arranged variant of the angular embodiment.
Figure 10:
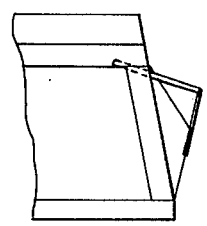
Figure 11:
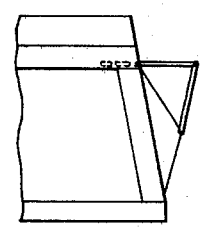

Turning now to FIGS. 3-11, three different positions or possibilities are shown for each of the three above-mentioned embodiments. Specifically, the flat-surface embodiment is shown in FIG. 3 with the window 40 in a closed position, in FIG. 4 with the window 40 in a partially opened position which is obtained by pivoting the upper window section 42' outwardly, and in FIG. 5 with the second frame 18 and the window 40 both in an open position obtained by pivoting the second frame 18 about to upper edge 14 of the first frame 12. The angle-surface embodiment is shown with the window 40' in the closed position in FIG. 6, partly open in FIG. 7 and fully opened in FIG. 8. In the third embodiment, the window 40' is shown closed in FIG. 9, partly open in FIG. 10 which is obtained by sliding the upper window section 42' inward into the cab 10', and fully opened in FIG. 11. As is indeed clear from FIGS. 9-11, this variant has the advantage that a substantial amount of free space is available both inside and outside the cab 10'. The outside free space is desirable for it permits various devices, such as lights, to be attached to the cab 10' as well as permitting hookup with apparatuses which are designed to be attached closely against the body of the vehicle.

While this invention has been described in conjunction with three specific embodiments, it is to be understood that many alternatives, modifications, and variations will be apparent to those skilled in the art in light of the aforegoing description. Accordingly, this invention is intended to embrace all such alternatives, modifications, and variations which fall within the spirit and scope of the appended claims.

I claim:
1. A window assembly for a vehicle cab, said cab having a first frame which establishes a window area, said first frame having upper and lower surfaces, said window assembly comprising:
   (a) a second frame including a top rail, a bottom rail and a pair of oppositely aligned side guide rails;
   (b) first means for pivotably attaching said top rail of said second frame to said upper surface of said first frame;
   (c) second means for locking said bottom rail of said second frame to said lower surface of said first frame;
   (d) a hydraulic cylinder connected between said cab and said top rail of said second frame, movement of said hydraulic cylinder causing said second frame to pivot relative to said first frame and to retain a given position relative to said first frame; and
   (e) upper and lower window sections joined together by a flexible connection which permits said window sections to tilt relative to each other, said upper window section being pivotably connected to said second frame and said lower window section having an elongated guide member secured to a bottom edge thereof, said guide member having oppositely aligned ends extending longitudinally outward from said lower window section which are slidably received in said pair of guide rails of said second frame for permitting said lower window section to pivot relative to said upper window section as said upper window section pivots outwardly about said top rail of said second frame.

2. The window assembly of claim 1 wherein positioning means are connected between said cab and said upper window section for opening and closing said window sections relative to said second frame.

3. The window assembly to claim 2 wherein said positioning means are hydraulic cylinders.

4. The window assembly of claim 1 wherein said second frame has a pair of triangular side members secured thereto which extend outward beyond said top and bottom rails, each of said triangular side members having an apex which coincides approximately with the line of connection of said upper window section to said lower window section.

5. The window assembly of claim 4 wherein guide rails are formed on a lower leg of each of said triangular side members.

6. The window assembly of claim 5 wherein said guide rails extend from said bottom rail of said second frame to the apexes of said two triangular side members.

7. The window assembly of claim 4 wherein said upper and lower window sections are angularly positioned outward by said two triangular side members from said second frame by an angle of about 10 to 30 degrees.

8. A window assembly for a vehicle cab, said cab having a first frame which establishes a wondow area, said first frame having upper and lower surfaces and further having inwardly arranged directional members positioned approximate said upper surface, said window assembly comprising:
   (a) a second frame including a top rail, a bottom rail and a pair of oppositely aligned side guide rails;
   (b) first means for pivotally restraining the outward movement of said top rail away from said upper surface of said first frame while permitting said top rail to slide on said directional members;
   (c) second means for locking said bottom rail of said second frame to said lower surface of said first frame;
   (d) a hydraulic cylinder connected between said cab and said top rail of said second frame, movement of said hydraulic cylinder causing said second frame to move relative to said first frame and to retain a given position relative to said first frame;
   (e) upper and lower window sections joined together by a flexible connection which permits said window sections to tilt relative to each other, said upper window section being pivotably connected to said second frame and said lower window section having an elongated guide member secured to a bottom edge thereof, said guide member having oppositely aligned ends extending longitudinally outward from said lower window section which are slidably received in said pair of guide rails of said second frame for permitting said lower window section to pivot relative to said upper window section as said upper window section pivots outwardly about said top rail of said second frame.

9. The window assembly of claim 8 wherein positioning means are connected between said cab and said upper window section for opening and closing said window sections relative to said second frame.

10. The window assembly of claim 9 wherein said positioning means are hydraulic cylinders.

11. The window assembly of claim 8 wherein said second frame has a pair of triangular side members secured thereto which extend outward beyond said top and bottom rails, each of said triangular side members having an apex which coincides approximately with the line of connection of said upper window section to said lower window section.

12. The window assembly of claim 11 wherein guide rails are formed on a lower leg of each of said triangular side members.

13. The window assembly of claim 12 wherein said guide rails extend from said bottom rail of said second frame to the apexes of said two triangular side members.

14. The window assembly of claim 11 wherein said upper and lower window sections are angularly positioned outward by said two triangular side members from said second frame by an angle of about 10 to 30 degrees.

* * * * *

UNITED STATES PATENT AND TRADEMARK OFFICE
CERTIFICATE OF CORRECTION

PATENT NO.    : 4,443,035
DATED         : 17 April 1984
INVENTOR(S)   : Karl L. Saemann It is certified that error appears in the above-identified patent and that said Letters Patent is hereby corrected as shown below:

Column 5, line 7, delete "to" and insert -- of --; line 28, delete "wondow" and insert -- window --.

Signed and Sealed this

Fourth Day of September 1984

[SEAL]

Attest:

GERALD J. MOSSINGHOFF

Attesting Officer

Commissioner of Patents and Trademarks